Figure 1:
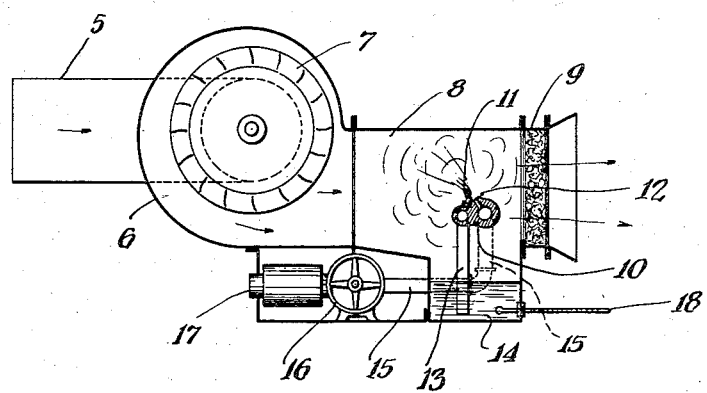

Oct. 16, 1934.  S. M. ANDERSON  1,976,911

TEMPERATURE INDICATOR

Filed June 21, 1930

INVENTOR.
SAMUEL M. ANDERSON
BY Duell, Dunn & Anderson
ATTORNEYS.

Patented Oct. 16, 1934

1,976,911

UNITED STATES PATENT OFFICE 1,976,911

TEMPERATURE INDICATOR

Samuel M. Anderson, Sharon, Mass., assignor to B. F. Sturtevant Company, Boston, Mass., a company Application June 21, 1930, Serial No. 462,780

1 Claim. (Cl. 73—24)

This invention relates to temperature indicators and relates more particularly to an instrument for indicating the wet bulb temperature of a quantity of air.

The term "wet bulb temperature" is one that is becoming more and more familiar since air conditioning systems incorporating humidifiers and dehumidifiers are now playing important parts in indoor comfort.

It is now well known that the amount of moisture in the air breathed is an important factor in comfort conditions and that in winter living conditions in heated buildings are greatly improved when the air within the buildings contains a substantial amount of moisture or water vapor. When air is heated in the absence of free water, as is customary when hot air furnaces or steam radiators are used for heating, it becomes drier, although the actual amount of water vapor present remains the same. In other words, the absolute humidity is the same, but the relative humidity has been lowered. Relative humidity is the ratio of the weight of water vapor in a given space as compared to the weight which the same space is capable of containing when fully saturated at the same temperature. Dry heated air is injurious to the nose, throat, and lungs when constantly breathed and is at times responsible for sore throats and ordinary colds. In order that healthful conditions may be restored, it is necessary to add moisture to heated air. Sufficient moisture should be added to the air in public buildings to maintain a relative humidity from 35 to 50%. The humidity to be recommended in good practice is 50% with a room temperature of 72 degrees F.

Humidity also plays a prominent part in many manufacturing processes. The amount of moisture required varies widely according to the nature of the process, some processes requiring high and others low relative humidities. In textile mills the necessity for humidifying and cooling the air has long been known. Today the field of application of humidity control apparatus includes such industries as candy, paper, tobacco, rubber goods, bakeries, and others. The advantages obtained through humidity control are many. The time of manufacture may be reduced, the quality increased, less breakage or waste occurs. In fact, in all cases continuous production may proceed under conditions that are most favorable, regardless of outdoor weather.

In summer in certain locations where the relative humidity of the outdoor air is high, a large portion of the time, the air entering the ventilating systems of buildings needs to be dehumidified, that is, a certain amount of moisture should be extracted from the incoming air.

Comfortable conditions for human beings and proper air conditions for manufacturing processes are expressed both in terms of relative humidity and temperature. For example, as has been before stated, a desirable indoor condition is to have a relative humidity of 50% and a room temperature of 72 degrees F. Relative humidity in turn depends upon both the factors of temperature and moisture content, and a clear conception of the relation between temperature and moisture content is essential to an appreciation of air conditioning. Relative humidity of air is determined by a comparison of the wet and dry bulb temperatures of the air. The dry bulb temperature of the air may be taken with the ordinary common thermometer since the dry bulb temperature is a measure of the degree of heat of the air. There is a second temperature of the air which measures its degree of moistness just as the dry bulb temperature measures its degree of heat. This second temperature is called the wet bulb temperature and is the temperature of evaporation, that is, the temperature at which the air would become saturated if moisture were added to it without the addition or subtraction of heat. The wet bulb temperature in conjunction with the dry bulb temperature is an exact measure of the humidity of the air and it is also an exact measure of the heat content of the air. Therefore, in dealing with air conditioning equipment, it is essential that accurate indicating instruments be available for indicating and at times recording instantaneously and accurately the wet and dry bulb temperatures of air since a change in either of these temperatures will result in change in relative humidity. With knowledge at all times of the wet bulb and dry bulb temperature of the air within an enclosure or entering an enclosure from air conditioning equipment, changes may be made in the adjustments of the controlling devices in order that desired conditions may be maintained as before stated.

The ordinary dry mercury thermometer gives an accurate indication of dry bulb temperatures, but up to the present time no suitable instrument has been devised to give readings satisfactorily of wet bulb temperatures. The ordinary instrument for reading wet bulb temperatures consists of an ordinary thermometer having its bulb covered with a moistened wick, the air being caused to pass rapidly over the wick to evaporate the moisture therefrom either by means of a small fan, by aspiration, or by rapidly whirling the thermometer. An instrument using a wetted wick is neither accurate nor sensitive. The wick has to be wetted every time it is desired to take a reading and the methods of causing air to pass rapidly over the wick are not satisfactory. Obviously an instrument requiring no manual manipulation or adjustments which would give accurate and quick reading of wet bulb temperature is desirable.

An object of this invention is to quickly and accurately read wet bulb temperatures.

A more definite object of the invention is to provide a portable instrument for determining wet bulb temperatures.

A further object of the invention is to provide a portable self-contained instrument requiring no adjustment or manipulation, by means of which the wet bulb temperature of a sample of air can be accurately and quickly read.

One embodiment of this invention comprises a spray nozzle, by means of which a stream of compressed air projects a finely divided water spray into a small air chamber. The water supply for the spray nozzle is contained in a small shallow water basin in the spray chamber and is continuously recirculated through the spray chamber. The sample of air to be analyzed passes slowly through the spray chamber and is saturated by the finely divided spray from the spray nozzle. Due to the fact that a portion of the water from the spray nozzle is precipitated, it drains back into the basin in the spray chamber and is recirculated so that the water in the basin quickly assumes the wet bulb temperature of the air passing through the spray chamber.

A thermometer or other suitable temperature indicator is placed in contact with the water in the basin and indicates the temperature of this water, which of course is the wet bulb temperature of the sample of air.

Figure 2:
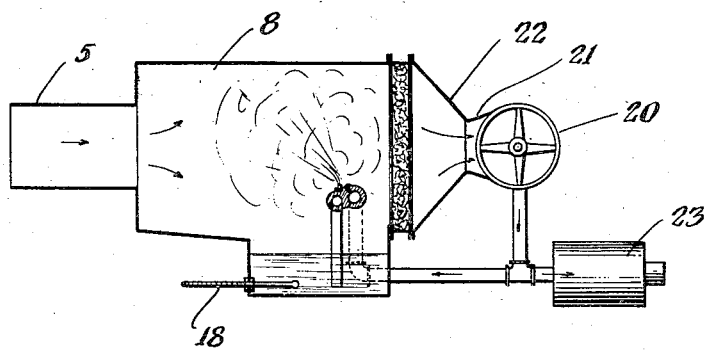

The invention will now be described with reference to the drawing, of which:

Fig. 1 is a side view showing the apparatus within a small portable wet bulb temperature indicator according to this invention, and Fig. 2 is a view of another form of wet bulb temperature indicator which may be used instead of the one shown by Fig. 1.

Referring now to Fig. 1, the sample of air to be analyzed is drawn through a tube 5 into the housing 6 of the circulating fan 7 by action of the fan, which is preferably driven by an electric motor (not shown). The air passing the fan 7 enters the spray chamber 8 and passes through the filter 9. In the spray chamber 8 is arranged the spray nozzle 10 which comprises the water nozzle 11 and the compressed air nozzle 12. The water nozzle is connected by the pipe 13 to the water basin 14 in the base of the spray chamber 8. The compressed air nozzle is connected by means of the pipe 15 to the air compressor 16, which is preferably driven by a small electric motor (not shown). The intake to the compressor 16 may consist of a silencer 17 which may serve to reduce the noise of operation of the device. The thermometer 18 has its bulb within the water in the basin 14 and has its scale arranged so that it may be read exterior to the device.

In operation the compressor 16 and the fan 17 are started with the tube 5 arranged to pick up the air to be analyzed. The sample of air passes through the tube 5 past the fan 7 and through the spray chamber 8, and out the filter 9. The compressed air passes out the orifice of the nozzle 12 across the mouth of the water nozzle 11 causing the water to be drawn up through the tube 13 to the mouth of the water nozzle 11, where it is broken up into a finely divided atomized spray and projected in a direction opposite to that of the air by the action of the compressed air stream. The sample of air passing through the spray chamber 8 is in contact with the water spray throughout the length of the chamber and is saturated by the very finely divided water spray. A portion of the water taken up by the water passing through to the spray chamber 8 is precipitated in the filter 9 so that no entrained moisture passes from the device. The amount which is not supported by the air leaving the device drains down through the spray chamber 8 and the filter 9, into the water basin 14. That portion of the spray which drains back into the water basin 14, due to the fact that it is so finely divided when contacting with the air passing through the spray chamber 8, takes on the temperature of the saturated air, which of course is the wet bulb temperature of the air. Since the small amount of water in the basin 14 is continuously recirculated in spray form through the spray chamber 8, the entire amount of water after the first moment of operation takes on the wet bulb temperature of the air, so that the thermometer 18 which has its bulb in contact with the water in the basin 14 gives a reading of the wet bulb temperature.

It is believed to be clear that the temperature of the water in the water basin 14 corresponds with the wet bulb temperature of the air since the water in the basin 14 after the first moment of operation has the same temperature as that of the spray at any given moment. This corresponds with the definition of wet bulb temperature, which is, that it is the temperature at which the air becomes saturated when moisture is added to it without the addition or subtraction of heat. The water in the spray and in the basin does not add or subtract any appreciable amount of heat from the air passing through it since, due to its continuous intimate contact with the air, it takes on substantially the temperature of the air which it saturates.

In Fig. 1, the fan for drawing a sample of air through the device is shown between the air intake and the spray chamber. It should be understood that the circulating fan may be on the outlet side of the device as well, such an arrangement being shown by Fig. 2.

The device illustrated by Fig. 2 is substantially the same as that shown by Fig. 1, except that where the device of Fig. 1 uses a rotary fan to draw an air sample to the spray chamber, the device shown by Fig. 2 has the intake of the air compressor so arranged that its suction draws a sample of air through the spray chamber 8.

Referring now to Fig. 2, the air compressor 20 has its intake 21 arranged within the outlet 22 of the spray chamber 8 in such a manner that the air entering the compressor 20 passes through the spray chamber 8 and the tube 5, thus drawing a current of air through the tube 5 and the spray chamber 8. The apparatus is so arranged that the compressor is made to handle from 10 to 15 cubic feet of air per minute, only about three of which pass through the atomizing nozzle into the spray chamber, the rest of the air passing through the muffler 23 into the atmosphere. By having a much larger quantity of air handled by the compressor than that which is passed into the spray chamber from the compressor, a large quantity of air has to be drawn in through the air intake tube 5, this in addition to the air which may be recirculated. The remainder of the apparatus in Fig. 2 and its cooperating action is the same as in Fig. 1, so that for the purpose of brevity and clarity the constituent parts are given the same numbers as the corresponding pieces of apparatus in Fig. 1. The operation of the device of Fig. 2 is exactly the same except that the need for rotary fan 7 has been done away with, thus simplifying the device.

It is believed to be obvious that the devices, as illustrated by Figs. 1 and 2, have many features of novelty and utility. Due to the finely divided spray in the spray chamber 8 which can be produced, it is believed, only by the particular form of spray nozzle there shown, the water quickly takes on the wet bulb temperature of the air so that an accurate and almost instantaneous reading can be made once the collection of the air to be analyzed is begun. Obviously many readings can be taken without the necessity of renewing the supply of water in the water basin 14. There is no longer the necessity for wetting a wick or whirling the thermometer through the air to obtain a wet bulb temperature. The devices may be made very small, compact, and easily portable.

While the devices illustrated have been described as being small, compact, portable ones, it is believed to be obvious that they could be large units capable of conditioning air for buildings, the principle of operation being the same in both cases.

In Fig. 1 a silencer is shown on the intake side of the air compressor. In Fig. 2 a silencer is shown on the outlet side of the compressor. It should be understood, however, that mufflers may be used on either the intake or outlet sides of the units described, or may be used on both sides, the necessity for the arrangement of mufflers depending upon operating requirements.

It is realized that the features of this invention which have been above described with connection with the reading of temperatures may be also utilized in connection with the recording of temperatures at an instant or over a period of time and that the same features lend themselves readily to automatic control of air conditioning apparatus through utilization of thermostats or other devices.

Whereas one or more embodiments of the invention have been described for the purposes of illustration it should be understood that the invention is not limited to the particular embodiments described, but only by the annexed claim.

What is claimed is:

Apparatus for indicating the wet bulb temperature of air, comprising a spray chamber, means for passing a current of air to be analyzed through said chamber, means for projecting an atomized spray of water in said chamber, a basin for collecting the water returned from said spray, means for collecting the entrained moisture from the air passing from said chamber and returning it with the returned spray water into said basin, and means for indicating the temperature of the water from said spray and removed from the air.

SAMUEL M. ANDERSON.